Figure 1:
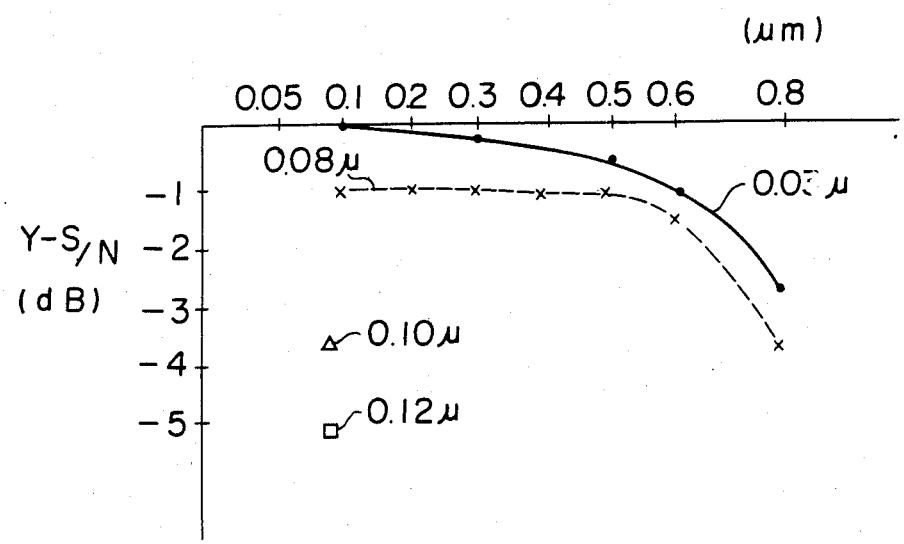

United States Patent [19]

Nishimatsu et al.

[11] Patent Number: 4,614,687

[45] Date of Patent: Sep. 30, 1986

[54] MAGNETIC RECORDING MEDIUM

[75] Inventors: Masaharu Nishimatsu; Toshiaki Ide; Yoshiaki Saito; Yuichi Kubota, all of Tokyo, Japan

[73] Assignee: TDK Corporation, Tokyo, Japan

[21] Appl. No.: 627,546

[22] Filed: Jul. 3, 1984

[30] Foreign Application Priority Data

Jul. 26, 1983 [JP] Japan ............................ 58-135126

[51] Int. Cl.$^4$ .............................................. G11B 5/70
[52] U.S. Cl. ............................ 428/329; 252/62.54; 360/134; 360/135; 360/136; 427/128; 427/131; 428/522; 428/425.9; 428/694; 428/695; 428/900
[58] Field of Search ............... 428/694, 695, 900, 522, 428/425.9, 328, 329; 427/131, 44, 128; 360/134-136; 252/62.54

[56] References Cited

U.S. PATENT DOCUMENTS

| 4,439,486 | 3/1984 | Yamada | 428/425.9 |
| 4,452,863 | 6/1984 | Takizawa | 428/423.7 |
| 4,455,345 | 6/1984 | Miyatuka | 428/697 |
| 4,537,833 | 8/1985 | Kasuga | 428/695 |
| 4,547,419 | 10/1985 | Nishimatsu | 428/900 |
| 4,555,431 | 11/1985 | Miyatsuka | 428/141 |
| 4,560,617 | 12/1985 | Nishimatsu | 428/900 |
| 4,567,083 | 1/1986 | Arioka | 428/900 |

Primary Examiner—Ellis P. Robinson
Attorney, Agent, or Firm—Oblon, Fisher, Spivak, McClelland & Maier

[57] ABSTRACT

A magnetic recording medium which comprises a plastic base film and a magnetic layer formed on one side of the base film and composed of ferromagnetic alloy powder dispersed in a resin binder, characterized in that said ferromagnetic alloy powder has a surface area of at least 48 m$^2$/g as measured by BDT method, said magnetic layer has a coercive force of at least 1,000 Oe and a surface roughness of at most 0.08 μm, and a thermoset backing layer having a surface roughness of from 0.05 to 0.6 μm is formed on the other side of the base film, the backing layer being made of a thermosetting resin composition comprising a vinyl chloride-vinyl acetate-vinyl alcohol copolymer, a polyurethane resin and a polyisocyanate.

2 Claims, 2 Drawing Figures

MAGNETIC RECORDING MEDIUM

The present invention relates to a magnetic recording medium, and more particularly to a high density recording medium having excellent physical and electromagnetic conversion characteristics.

As ferromagnetic powders which have been employed for magnetic recording media, there are, for instance, $\gamma$-$Fe_2O_3$, Co-containing $\gamma$-$Fe_2O_3$, $Fe_3O_4$, Co-containing $Fe_3O_4$ and $CrO_2$. However, the magnetic characteristics of these ferromagnetic powders, such as the coercive force and the maximum residual magnetic flux density, are inadequate for high density recording with high sensitivity, and they are not suitable for magnetic recording of a signal having a short recording wavelength of at most about 1 $\mu$m or for magnetic recording with a narrow track width.

As the requirements for such magnetic recording media have become to be severe, ferromagnetic powders having characteristics suitable for high density recording have been developed or proposed. As such magnetic powders, there may be mentioned metals or alloys such as Fe, Co, Fe-Co, Fe-Co-Ni and Co-Ni, or alloys of these materials with Al, Cr or Si. A magnetic recording layer employing such an alloy powder, is required to have a high coercive force and a high residual magnetic flux density for the purpose of the high density recording, and it is required to select a process for the preparation or an alloy composition so that the above-mentioned magnetic powder meets these requirements.

The present inventors have prepared magnetic recording media by employing various alloy powders, and have found that a magnetic recording medium with a noise level being sufficiently low and suitable for high density short wave recording is obtainable when the specific surface area by BET method is at least 48 $m^2/g$, the coercive force of the magnetic layer is at least 1000 Oe, and the surface roughness of the magnetic layer is at most 0.08 $\mu$m as a $R_{20}$ value (an average value of 20 values) with a cut off of 0.17 mm by Talystep method hereinafter mentioned. However, if the surface property is improved in such a manner, the friction increases, whereby the stopping of the tape running and the defective winding of the tape are likely to result.

Further, there is a trend that the base film for the tape wherein an alloy magnetic powder is employed, becomes thinner. At present, a base film thickness of about 11 $\mu$m is being studied. As the base film material, typical examples include polyethyleneterephthalate, polyethylenenaphthalate, polyimide and polyamide.

As the base film becomes thinner, the medium tends to be so flexible that the friction increases and tends to lead to stoppage of the tape running. Therefore, it has become necessary to strengthen the base film to improve the running characteristics. As a conventional means for the improvement of the running characteristics, it is known to provide a top coat on the magnetic layer. In such a case, however, there has been a problem such that the lubricant on the top coat surface is not durable, or is likely to cause adhesion during the storage at a high temperature. Further, in the case of a magnetic layer made of an alloy powder, the surface roughness is extremely small, and when a top coat is applied thereto, adhesion is likely to be caused by the tightning of the winding of the tape. Under the circumstances, the present inventors have tried to form a backing layer to the rear side of the plastic base film. As a result, it has been found that the S/N ratio of the magnetic recording medium is affected not only by the specific surface area of the alloy powder used for the magnetic layer as measured by BET method and the surface roughness of the magnetic layer, but also by the surface roughness of the backing layer. Further, because of additional problems such as the cinching phenomenon (the loosening of the tape winding when the tape has been stopped abruptly), the abrasion or friction of the backing layer and the adhesion of the magnetic layer with the backing layer, it is impossible to obtain a magnetic recording medium having superior electromagnetic conversion characteristics, running characteristics and durability, without using a proper backing layer.

The present invention is intended to provide an excellent magnetic recording medium by a combination of a magnetic layer having specific magnetic and surface properties and a backing layer having specific physical and surface properties.

The present invention is based on a discovery that even when the surface property of the magnetic layer is improved (i.e. even when the surface roughness is reduced), it is possible to improve the running characteristics and yet reduce the dropout, and thus provide an excellent magnetic recording medium, by forming a backing layer made of a composition comprising a vinyl chloride-vinyl acetate-vinyl alcohol copolymer, a polyurethane resin and a polyisocyanate or such a composition which further contains nitrocellulose, or an additive, as the case requires, on the rear side of a plastic base film coated with a magnetic layer composed of an alloy magnetic powder having the above-mentioned specific BET surface area and coercive force and having the above-mentioned specific surface roughness, and selecting the surface roughness of the backing layer within a range of from 0.05 to 0.6 $\mu$m. Nemely, the present invention provides a magnetic recording medium which comprises a plastic base film and a magnetic layer formed on the base film and composed of ferromagnetic alloy powder dispersed in a resin binder, characterized in that said ferromagnetic alloy powder has a surface area of at least 48 $m^2/g$ as measured by BDT method, said magnetic layer has a coercive force of at least 1,000 Oe and a surface roughness of at most 0.08 $\mu$m and a thermoset backing layer having a surface roughness of from 0.05 to 0.6 $\mu$m is formed on the other side of the base film, the backing layer being made of a thermosetting resin composition comprising a vinyl chloride-vinyl acetate-vinyl alcohol copolymer, a polyurethane resin and a polyisocyanate.

Now, the present invention will be described in detail with reference to the preferred embodiments.

In the accompanying drawings, FIG. 1 is a graph illustrating the relationship between the S/N ratio and the surface roughness of the magnetic and backing layers of the magnetic recording medium.

Figure 2:
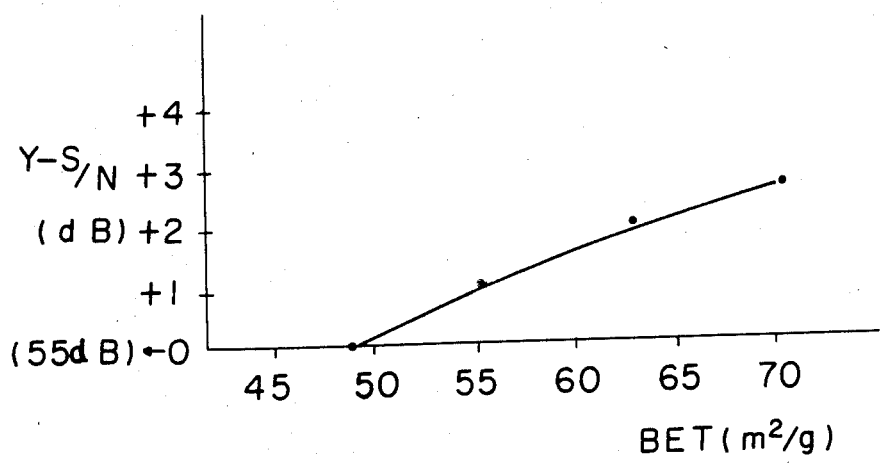

FIG. 2 is a graph illustrating the relationship between the S/N ratio and the BET specific surface area of the alloy magnetic powder.

The magnetic layer of the magnetic recording medium of the present invention has a coercive force (Hc) of at least 1000 Oe and a surface roughness of at most 0.08 $\mu$m, and the alloy magnetic powder in the magnetic layer has a specific surface area of at least 48 $m^2/g$ as measured by BET method.

The preferred range of the coercive force is from 1000 to 2000 Oe. If the coercive force exceeds this range, the magnetic head tends to be saturated at the time of recording, or it becomes difficult to erase the magnetization. The greater the specific surface area of the magnetic powder, the more the S/N ratio will be improved. However, if the specific surface area is too large, the dispersibility of the magnetic powder into the binder tends to be poor, or the effectivness tends to be saturated. On the other hand, if the surface roughness is small, the recording sensitivity for a short wave length will increase.

As a magnetic alloy to satisfy the above characteristics, there may be employed fine powders of Co, Fe-Co, Fe-Co-Ni or Co-Ni, or such fine powders mixed with Cr, Al or Si. They may be fine powders obtained by wet-reducing a metal salt with a reducing agent such as $BH_4$, fine powders obtained by coating the surface of iron oxide with a Si compound and dry-reducing the product in $H_2$ gas, or fine powders obtained by evaporating an alloy in a low pressure argon atmosphere, and they have a axial ratio of from 1 : 5 to 1: 10 and a residual magnetic flux density Br of from 2000 to 3000 gauss, and satisfy the above-mentioned conditions for the coercive force and the surface area.

Various binders may be employed in combination with the alloy magnetic powder to prepare magnetic coating compositions. It is usually preferred to employ a thermosetting resin binder or an electron beam-setting resin binder. As other additives, there may be employed a dispersant, a lubricant or an antistatic agent in accordance with the conventional method. In a case where there is a problem in the dispersibility because of the employment of the magnetic powder having a BET specific surface area of 48 m$^2$/g, a surfactant or an organic titanium coupling agent may be employed as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation-setting resin binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is coated on a substrate such as a polyester base film and then subjected to thermosetting or electron beam setting to form a magnetic layer, which is then subjected to super calendering. Then, a backing layer is formed in a similar manner, and the entire product is subjected to super calendering to obtain a recording medium having a predetermined surface roughness. When the backing layer formed on the rear side of the thin base film such as a polyester base film, is made of a thermosetting binder comprising a vinyl chloride-vinyl acetate-vinyl alcohol copolymer, a polyurethane prepolymer and a polyisocyanate or a thermosetting mixture of such a binder with nitrocellulose, the abrasion resistance of the backing layer can be remarkably improved, and yet the moldability by the calender processing will be improved. The surface roughness of the backing layer of the present invention is preferably from 0.05 to 0.6 μm. Coupled with the material of the backing layer, this surface roughness serves not only to improve the running characteristics of the tape and the abrasion resistance, but also to reduce the adhesion with the magnetic layer and the cinching phenomenon. Furthermore, it has been found that in connection with the surface roughness of the magnetic layer, the S/N ratio can be maintained at a satisfactory level when the surface roughness of the backing layer is at most 0.6 μm. It has been found that when the surface roughness is less than 0.05 μm, there will be the cinching phenomenon, the adhesion and a problem in the running property.

The proportions of the components of the binder for the backing layer, may be varied within wide ranges. However, in the case of a combination of a vinyl chloride-vinyl acetate-vinyl alcohol copolymer and a polyurethane, it is preferred to use from 10 to 80% by weight of the former and the rest being the latter and to add a polyisocyanate in an amount of from 5 to 80 parts by weight relative to 100 parts by weight of the total amount of the above resins.

In the case where nitrocellulose is added to the above binder composition, from 15 to 60% by weight of nitrocellulose, from 15 to 60% by weight of a vinyl chloride-vinyl acetate-vinyl alcohol copolymer and from 10 to 70% by weight of a polyurethane may be used to bring the total amounts to be 100% by weight. Then, a polyisocyanate is added in an amount of from 5 to 80 parts by weight relative to 100 parts by weight of the total amount of the above resins. The addition of nitrocellulose serves to further reduce the adhesion and to further improve the abrasion resistance.

As fillers to be used for the backing layer in the present invention, there may be mentioned 1) a conductive filler such as graphite or carbon black, and 2) an inorganic filler such as $SiO_2$, $TiO_2$, $Al_2O_3$, $Cr_2O_3$, SiC, $CaCO_3$, zinc oxide, geothite, $\alpha$-$Fe_2O_3$, talc, kaolin, $CaSO_4$, boron nitride, teflon powder, fluorinated graphite or molybdenum disulfide. These fillers may be used in an amount of from 20 to 200 parts by weight in the case of the filler 1) or from 10 to 300 parts by weight in the case of the filler 2), relative to 100 parts by weight of the binder. If the amount of the fillers is too much, the coated film tends to be brittle, thus leading to a drawback that the dropout increases.

Now, the present invention will be described in further detail with reference to Examples. However, it should be understood that the present invention is by no means restricted by these specific Examples.

EXAMPLE 1

Various alloy powders were prepared by a wet-reducing method. These powders were composed of acicular particles having an axial ratio (i.e. short axis/long axis) of from 1/5 to 1/10, and having a residual magnetic flux density of from 2000 to 3000 gauss, a coercive force of from 1000 to 2000 Oe and a BET specific surface area of from 45 to 70 m$^2$/g. Each of these magnetic powders was mixed with other components in the following mixing ratio by a usual method.

|  | Parts by weight |
| --- | --- |
| Fe—Co—Ni alloy powder | 100 |
| Vinyl chloride-vinyl acetate-vinyl alcohol copolymer (VAGH manufactured by U.C.C. Co., U.S.A.) | 15 |
| Polyurethane prepolymer (Desmodule 22 manufactured by Bayer AG) | 10 |
| Methyl ethyl ketone/toluene (50/50) | 250 |
| Myristic acid | 2 |
| Sorbitol tristearate | 2 |

To the mixture thus obtained, 30 parts by weight of a polyisocyanate (Desmodule L manufactured by Bayer AG) was added to obtain a magnetic coating material. The coating material was coated on a polyester film in a thickness of 3.5 μm, then dried and subjected to calender treatment. Then, the treated film was subjected to a thermosetting reaction at 80° C. for 48 hours.

On the other hand, the following resin composition was prepared for the backing layer.

|  | Parts by weight |
|---|---|
| CaCO$_3$ (40 μm) | 70 |
| Vinyl chloride-vinyl acetate-vinyl alcohol copolymer (VAGH) | 30 |
| Polyurethane prepolymer (Desmodule 22) | 20 |
| Stearic acid | 5 |
| Myristyl myristate | 2 |
| Methyl ethyl ketone/toluene (50/50) | 300 |

To this mixture, 30 parts by weight of a polyisocyanate (Desmodule L) was added and mixed. The mixture was coated on the rear side of the above-mentioned polyester film provided with the magnetic layer, in a thickness of 1 μm, then dried and subjected to calender treatment, followed by thermosetting and then cutting into a video tape.

By controlling the calender treatment, the surface roughness of the magnetic layer was adjusted to be within a range of from 0.02 to 0.12 μm and the surface roughness of the backing layer was adjusted to be within a range of from 0.05 to 0.8 μm.

EXAMPLE 2

With use of the same magnetic powders as used in Example 1, mixtures having the following composition were prepared.

|  | Parts by weight |
|---|---|
| Fe—Co—Ni alloy powder | 100 |
| Vinyl chloride-vinyl acetate-vinyl alcohol copolymer (VAGH) | 10 |
| Polyvinylbutyral resin | 10 |
| Polyurethane containing an acrylic double bond (4040 manufactured by Nippon Polyurethane Co. with its terminals modified with MDI and HEMA) | 10 |
| Methyl ethyl ketone/toluene (50/50) | 250 |
| Myristic acid | 2 |
| Sorbitol tristearate | 2 |

Each mixture was coated on a polyester film in a thickness of 3.5 μm, then dried, subjected to calender treatment and cured by electron beams.

Then, a backing layer was formed in the same manner as in Example 1, except that the following composition was employed.

|  | Parts by weight |
|---|---|
| Nitrocellulose (Nitrocellulose manufactured by Dicell) | 30 |
| Carbon black | 30 |
| Al$_2$O$_3$ | 20 |
| Vinyl chloride-vinyl acetate-vinyl alcohol copolymer (VAGH) | 30 |
| Polyurethane prepolymer (Desmodule 22) | 40 |
| Stearic acid | 5 |
| Myristyl myristate | 2 |

| -continued |  |
|---|---|
|  | Parts by weight |
| Methyl ethyl ketone/toluene (50/50) | 400 |

Video tapes wherein the surface roughness of the magnetic layer is within a range of from 0.02 to 0.12 μm and the surface roughness of the backing layer is within a range of from 0.05 to 0.8 μm, were prepared.

COMPARATIVE EXAMPLE 1

A comparative tape was prepared in the same manner as in Example 1 except that 25 parts by weight of a polyurethane prepolymer was used instead of VAGH for the backing layer.

Study of the results

The surface roughness of the video tapes obtained in Example 1 was studied. FIG. 1 shows the S/N ratios (relative values) in the case where the video tapes were driven at a speed of 3.8 m/sec and the recording and reproduction were conducted with a major frequency of 4.5 MHz. However, the numerical values alloted to the curves indicate the surface roughness. As is evident from the Figure, the S/N ratio can be kept at a high level when the surface roughness of the magnetic layer is at most 0.08 μm, and the surface roughness of the backing layer is at most 0.6 μm. The same was true also with respect to Example 2.

Then, from the study of the running friction, it was found that the friction was great when the surface roughness of the backing layer was less than 0.05 μm.

In Example 1, the relation between the BET specific surface area of the alloy powder and the S/N ratio was investigated with respect to the video tapes wherein the surface roughness of the magnetic layer was at most 0.08 μm and the surface roughness of the backing layer was within a range of from 0.05 to 0.6 μm, whereby the results as shown in Table 2 were obtained. However, 55 dB was employed as the reference. From FIG. 2, it is apparent that excellent characteristics are obtainable when the BET value is at least 48 m$^2$/g. The same was true also in the case of the Example 2.

Other characteristics are shown in the following Table.

It was found that the cinching phenomenon, the adhesion and the abrasion could be reduced when each surface roughness was within the above-mentioned range. Especially, in Example 2, the adhesion and abrasion were particularly low.

On the other hand, in Example 2 where an electron beam-setting resin binder was used for the magnetic layer, the dropout was less and the effect on the electromagnetic characteristics with the alloy was better than the one wherein the backing layer of Example 2 was used for the magnetic layer of Example 1.

TABLE

|  | Frictional coefficient | Cinching phenomenon | Abrasion of the backing layer | Adhesion with the magnetic layer |
|---|---|---|---|---|
| Example 1 | 0.35 |  |  |  |
| Example 2 | 0.30 |  |  |  |
| Comparative | 0.05 | X | X | Δ |

TABLE-continued

|  | Frictional coefficient | Cinching phenomenon | Abrasion of the backing layer | Adhesion with the magnetic layer |
| --- | --- | --- | --- | --- |
| Example 1 | | | | |

Note:
◎: Excellent,
○: Good,
Δ: Fair,
X: No good

The various characteristics were measured or evaluated as follows.

1. Frictional coefficient

A magnetic tape was put around a polished aluminum cylinder having a diameter of 4 mm at an angle of 180° so that the backing layer is located inside, and permitted to run at a speed of 2 cm/sec, whereby the tension at the dispensing side and the winding-up side were measured, and the frictional coefficient was obtained by calculation.

2. Cinching phenomenon

By means of a commercially available VHS system VTR, a tape was fast forwarded for its entire length, then fast rewound, stopped at a point where 50 m remains, and then again fast rewound to the end. Then, the winding of the tape was visually examined. Good winding where no space was observed in the tape winding, was designated by O, and inferior winding where a space was observed in the tape winding, was designated by X.

3. Abrasion of the backing layer

By means of a commercially available VHS system VTR, a tape was permitted to run 100 times at 40° C. under a relative humidity of 80%, whereupon the stain in the cassette case was examined. The case where a stain was observed, was designated by X, and the case where no stain was observed, was designated by O.

4. Adhesion of the magnetic layer with the backing layer

A tape was wound up on a VHS reel, and left to stand at 60° C. for 5 days, whereupon the adhesion was visually evaluated. The case where no adhesion was observed, was designated by O, and the case where adhesion was observed, was designated by X.

5. Surface roughness

The surface roughness was obtained by 20 point average method ($R_{20}$) from the chart obtained by means of Tallistep (manufactured by Taylor-Hobson Co.). A cut off of 0.17 mm, a needle pressure of 2 mg and a needle of $0.1 \times 2.5$ μm were employed.

We claim:

1. A magnetic recording medium which comprises a plastic base film and a magnetic layer formed on one side of the base film and composed of ferromagnetic alloy powder dispersed in a resin binder, characterized in that said ferromagnetic alloy powder has a surface area of at least 48 m$^2$/g as measured by BDT method, said magnetic layer has a coercive force of at least 1,000 Oe and a surface roughness of at most 0.08 μm, and a thermoset backing layer having a surface roughness of from 0.05 to 0.6 μm is formed on the other side of the base film, the backing layer being made of a thermosetting resin composition comprising a vinyl chloride-vinyl acetate-vinyl alcohol copolymer, a polyurethane resin and a polyisocyanate.

2. The magnetic recording medium according to claim 1, wherein the thermosetting resin composition further contains nitrocellulose.

* * * * *

UNITED STATES PATENT AND TRADEMARK OFFICE
CERTIFICATE OF CORRECTION

PATENT NO. : 4,614,687
DATED : September 30, 1986
INVENTOR(S) : MASAHARU NISHIMATSU ET AL It is certified that error appears in the above-identified patent and that said Letters Patent is hereby corrected as shown below:

IN THE ABSTRACT

Line 6, delete "BDT" and insert --BET--.

IN THE SPECIFICATION

Column 2, line 44, delete "BDT" and insert --BET--.

IN THE CLAIMS

Claim 1, line 6, delete "BDT" and insert --BET--.

Signed and Sealed this

Third Day of March, 1987

Attest:

DONALD J. QUIGG

*Attesting Officer*   *Commissioner of Patents and Trademarks*